J. SWAN.
Machines for Manufacturing Auger-Bits.
No. 5,624. Reissued Oct. 21, 1873.
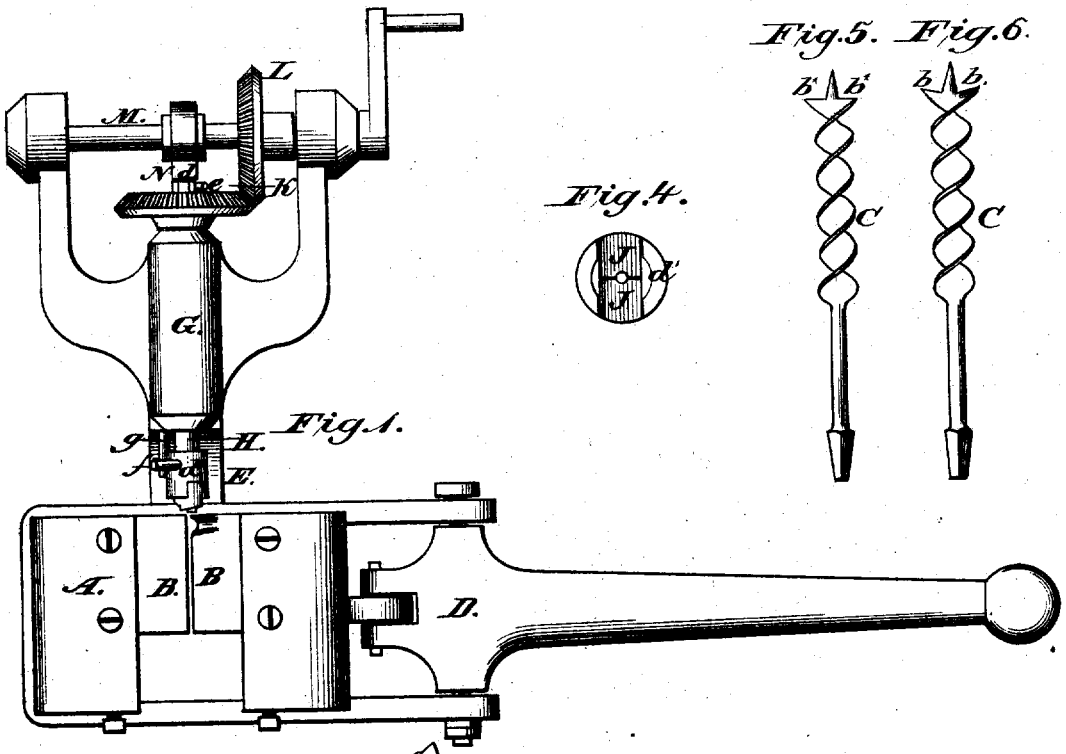
Fig. 1.
Fig. 4.
Fig. 5. Fig. 6.
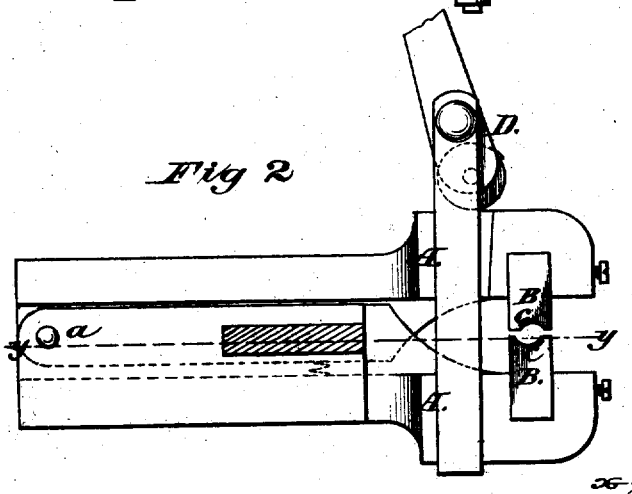
Fig 2
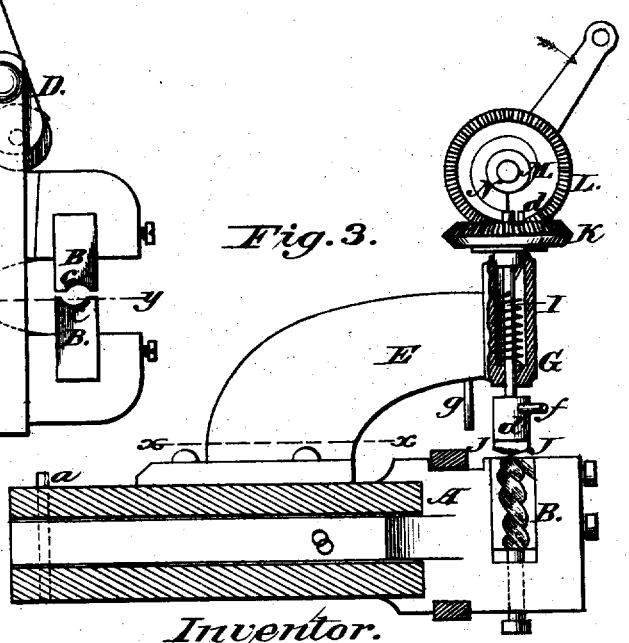
Fig. 3.
Witnesses:
S. Morris Pool
W. T. Hutchinson
Inventor.
James Swan
by Crosby & Gould Attys.
AM. PHOTO-LITHOGRAPHIC Co. N.Y. (OSBORNE'S PROCESS.)

UNITED STATES PATENT OFFICE.

JAMES SWAN, OF SEYMOUR, CONN., ASSIGNOR TO RICHARD P. BRUFF.

IMPROVEMENT IN MACHINES FOR MANUFACTURING AUGER-BITS.

Specification forming part of Letters Patent No. 78,769, dated June 9, 1868; reissue No. 4,516, dated August 15, 1871; reissue No. 5,624, dated October 21, 1873; application filed July 24, 1873.

*To all whom it may concern:*

Be it known that I, JAMES SWAN, of Seymour, in the county of New Haven and State of Connecticut, have invented a new and useful Improvement in Machinery for Manufacturing Augers and Bits; and I do hereby declare that the following is a full, clear, and exact description thereof, which will enable those skilled in the art to make and use the same, reference being had to the accompanying drawing forming part of this specification.

The invention relates to certain improvements in the manufacture of curved or gage-lip augers. In making augers and bits of the above description, it is necessary to leave a sufficient thickness of metal at the bit to admit of the point or screw being formed, after which the lips require to be reduced and brought to a knife-like edge at their cutting parts, which process is termed "upsetting," and has hitherto been done by hand, but the most skillful workman can scarcely obtain a perfect form of cutters, and perfect uniformity in the two lips is rarely ever obtained.

In my invention I employ griping or clamping jaws, that grasp and firmly hold the auger-blank just above the lips, the jaws being fitted to receive the helical threads of the auger-blank, and, in connection with these jaws, swaging or drawing dies, to which is imparted a rotative movement while they are in contact with the lips of the blank, such rotative movement upsetting the auger-lips and forming them to shape against the griper-dies.

My invention consists, primarily, in the combination of the clamping-dies formed to receive the auger-thread and rotating upsetting-dies, that, by their action upon the lips clamped by the griping-dies, upset and form the same.

My invention operates well, and performs the work expeditiously, with but very little manipulation on the part of the operator.

In the accompanying drawing, Figure 1 is a front view of a machine embodying my invention. Fig. 2 is a sectional plan of the same, the upper part being removed, as indicated by the line *x x*, Fig. 3. Fig. 3 is a sectional elevation of the same, taken in the line *y y*, Fig. 2. Fig. 4 is an under or face view of the swaging or drawing die. Fig. 5 is a side view of an auger to be operated upon. Fig. 6 is a side view of an auger finished by my invention.

Similar letters of reference indicate corresponding parts.

A A represent two jaws, which may be connected at one end by a pivot, *a*, and have dies B B inserted in their opposite ends to receive and hold the screw portion of the auger C while its cutters or lips *b b* are being operated upon. The two jaws may be brought together and held by a lever, D, as will be fully understood by referring to Figs. 1 and 2. The upper surfaces of the dies B B are grooved or hollowed out to conform to the desired shape of the lips or cutters, as shown at *c c* in Fig. 2. E represents a curved standard, which is attached to one of the jaws of the machine. This standard projects forward and has a cylindrical socket, G, at its front end, in which an arbor, H, is fitted and rotates, and also moves longitudinally to and from the auger or bit. On this arbor H, within the socket G, there is shown an elastic retractor, I, made in the form of a spiral spring, one end thereof being attached to the arbor and the lower end attached to the bottom of the socket, as shown clearly in Fig. 3. This retractor I has a tendency to keep the arbor H raised, and, to lower the end of the arbor, there is attached a cylindrical hub, *d'*, in which the swaging or drawing dies J J are fitted, the lower surfaces or faces of these dies being slightly inclined. On the upper part of the arbor H there is fitted loosely a bevel-wheel, K, into which a corresponding wheel, L, gears, the latter being on a horizontal shaft, M, the bearings of which are connected to the socket G. The bevel-wheel K has an upright pin, *d*, attached to it, and a pin, *e*, projects horizontally from the upper part of the arbor H, as shown in Fig. 1. The shaft M has a cam, N, firmly secured upon it, against which the upper end of arbor H is kept in contact by the retractor I.

By this arrangement of the cam-retractor and gearing, as shown and described, two motions are given the arbor H—to wit, a longitudinal and a rotary movement—the arbor being pressed longitudinally in one direction by the action of the prominent portion of the cam N, and retracted by the retractor I when the prominent portion of the cam passes the upper end of the arbor. The rotary movement is given the arbor when the latter is forced or moved by the cam in consequence of the pin *d* of the wheel K coming in contact with the pin *e* of the arbor. A quarter revolution, however, is only given the arbor H, as, when the arbor is retracted, the pin *e* of the arbor clears the pin *d* of the wheel K. The arbor H, in turning the quarter revolution, as specified, winds the retractor I, which, as soon as the arbor retracts sufficiently to cause the pin *e* to clear the pin *d*, throws or turns back the arbor H to its original position, a pin, *f*, in the hub *d'* of the arbor coming in contact with a pin, *g*, in the under side of the standard E, these pins serving as a stop. (See Fig. 1.) The dies J J, when the arbor H is moved by the cam, act upon the lips or cutters *b b* of the auger or bit and draw them out to a thin edge, giving them the proper shape or form.

In Fig. 5, $b^{\times}$ represents the thick edges of an unfinished lip or cutter; and *b*, Fig. 6, the finished lip or cutter operated upon by my invention.

Having thus described my invention, I claim as new and desire to secure by Letters Patent—

1. The combination of clamping-jaws, having dies formed to receive the screw-thread of an auger, with a rotative die for upsetting the auger-lips, the jaws and die acting in conjunction to draw the lips, and the combination being substantially as shown and described.

2. The described method of forming or drawing the lips of augers, the auger-blank being first clamped in jaws formed to receive the auger-screw, (the lips extending beyond the jaws,) and the lips being then upset and drawn against the ends of the jaws by the rotative and forward action of a die, the ends of the jaws being formed to shape the lips under the action of the die.

3. The combination of the clamping-jaws B and the stationary or female dies formed therein; the die J, to operate in conjunction with said stationary dies, to bend, compress, and draw the lips of the blank; mechanism to impart to die J reciprocating rotary movements upon its axis; mechanism to force said die J gradually and rectilinearly up to and against the auger-bit, and the spring, or its equivalent, to suddenly force said die away from said bit, the combination being such as to effect the operations here ascribed to it, in the manner substantially as hereinbefore described.

4. The combination of the arbor H and supporting and guiding frame, mechanism to impart to said arbor a rectilinear and also a rotary movement, the spring I, arranged as described, to impart to said arbor reciprocal rectilinear and rotary movements in opposite directions, the die J, the clamping-jaws B, and the stationary or female bit-swaging dies upon or within said jaws B.

5. The combination of cam N, rotating wheel K, having vertical pin *d*, arbor H, having horizontal pin *e*, the hub *d'*, having pin *f*, and the hollow standard G, having pin *g*, all arranged substantially as described, to turn the stock *d'* exactly one quadrant of a circle, and no more.

JAMES SWAN.

Witnesses:
G. W. DIVINE,
FRED. A. RUGG.